(12) United States Patent
Peng et al.

(10) Patent No.: US 6,351,803 B2
(45) Date of Patent: *Feb. 26, 2002

(54) MECHANISM FOR POWER EFFICIENT PROCESSING IN A PIPELINE PROCESSOR

(75) Inventors: Chih-Jui Peng; Lew Chua-Eoan, both of San Jose, CA (US)

(73) Assignee: Hitachi Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,929

(22) Filed: Oct. 1, 1999

(51) Int. Cl.$^7$ .............................. G06F 9/30; G06F 15/16
(52) U.S. Cl. ..................................................... 712/216
(58) Field of Search ....................... 712/23, 208, 214, 712/216

(56) References Cited

U.S. PATENT DOCUMENTS

| | | | |
|---|---|---|---|
| 4,814,981 A | 3/1989 | Rubinfeld | 364/200 |
| 5,251,311 A | 10/1993 | Kasai | 395/425 |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,596,734 A | 1/1997 | Ferra | 395/825 |

(List continued on next page.)

FOREIGN PATENT DOCUMENTS

| | | | |
|---|---|---|---|
| EP | 0165600 B1 | 11/1991 | G06F/13/36 |
| EP | 0636976 B1 | 2/1995 | G06F/11/00 |
| EP | 0636976 A1 | 2/1995 | G06F/11/00 |
| EP | 0652516 A1 | 5/1995 | G06F/11/00 |
| EP | 0702239 A2 | 3/1996 | G01R/31/3173 |
| EP | 0720092 A1 | 7/1996 | G06F/11/00 |
| EP | 0933926 A1 | 8/1999 | H04N/5/00 |
| EP | 0945805 A1 | 9/1999 | G06F/12/08 |
| EP | 0959411 A1 | 11/1999 | G06F/13/24 |
| JP | 8320796 A | 12/1996 | G06F/9/46 |
| JP | 8329687 A | 12/1996 | G11C/15/00 |
| JP | 9212358 A | 8/1997 | G06F/9/38 |
| JP | 9311786 A | 12/1997 | G06F/9/38 |
| JP | 10106269 A | 4/1998 | G06F/12/08 |
| JP | 10124484 A | 5/1998 | G06F/17/10 |
| JP | 10177520 A | 6/1998 | G06F/12/10 |
| WO | PCT/JP96/02819 | 9/1996 | G06F/9/46 |

OTHER PUBLICATIONS

James E. Smith, "Implementing Precise Interrupts in Pipelined Procesors", IEEE, p.562–573, May 1988.*

Val Popescu, "The Metaflow Architecture" IFFF Mirco, pp. 10–13 and 63–73, Jun. 1991.*

Richard York; Real Time Debug for System–on–Chip Devices; Jun. 1999; pp. 1–6.

*Primary Examiner*—David Y. Eng
(74) *Attorney, Agent, or Firm*—Townsend and Townsend and Crew LLP (57) ABSTRACT

A processor including a plurality of execution pipeline stages where each stage accepts a plurality of operand inputs and generates a result. A pipefile having at least the same number of entries as the number of execution pipeline stages is included in the processor. A pointer register is associated with each execution pipeline stage. A value is stored in at least one of the pointer registers, the value indicating a particular one of the entries in the pipefile.

14 Claims, 9 Drawing Sheets

U.S. PATENT DOCUMENTS

| | | |
|---|---|---|
| 5,598,551 A | 1/1997 | Barajas et al. ............... 395/484 |
| 5,608,881 A | 3/1997 | Masumura et al. ......... 395/306 |
| 5,613,153 A | 3/1997 | Arimilli et al. ............. 395/821 |
| 5,627,842 A | 5/1997 | Brown et al. ............... 371/22.3 |
| 5,657,273 A | 8/1997 | Ayukawa et al. ...... 395/189.01 |
| 5,682,545 A | 10/1997 | Kawasaki et al. .......... 395/800 |
| 5,704,034 A | 12/1997 | Circello ................. 395/183.14 |
| 5,708,773 A | 1/1998 | Jeppesen, III et al. .. 395/183.06 |
| 5,724,549 A | 3/1998 | Selgas et al. ............... 395/468 |
| 5,737,516 A | 4/1998 | Circello et al. ........ 395/183.14 |
| 5,751,621 A | 5/1998 | Arakawa ............... 364/748.07 |
| 5,768,152 A | 6/1998 | Battaline et al. ....... 364/551.01 |
| 5,771,240 A | 6/1998 | Tobin et al. ............... 371/22.1 |
| 5,774,701 A | 6/1998 | Matsui et al. ............... 395/556 |
| 5,778,237 A | 7/1998 | Yamamoto et al. .... 395/750.04 |
| 5,781,558 A | 7/1998 | Inglis et al. ............... 371/21.1 |
| 5,796,978 A | 8/1998 | Yoshioka et al. ........... 395/416 |
| 5,828,825 A | 10/1998 | Eskandari et al. ..... 395/183.03 |
| 5,832,248 A | 11/1998 | Kishi et al. ................. 395/376 |
| 5,835,963 A | 11/1998 | Yoshioka et al. ........... 711/207 |
| 5,848,247 A | 12/1998 | Matsui et al. ............... 395/284 |
| 5,860,127 A | 1/1999 | Shimazaki et al. ......... 711/167 |
| 5,862,387 A | 1/1999 | Songer et al. .............. 395/728 |
| 5,867,726 A | 2/1999 | Ohsuga et al. ......... 395/800.32 |
| 5,884,092 A | 3/1999 | Kiuchi et al. ........... 395/800.35 |
| 5,896,550 A | 4/1999 | Wehunt et al. .............. 395/846 |
| 5,918,045 A | 6/1999 | Nishii et al. ................ 395/584 |
| 5,930,523 A | 7/1999 | Kawasaki et al. ..... 395/800.32 |
| 5,930,833 A | 7/1999 | Yoshioka et al. ........... 711/210 |
| 5,944,841 A | 8/1999 | Christie ....................... 714/38 |
| 5,950,012 A | 9/1999 | Shiell et al. ................. 395/712 |
| 5,953,538 A | 9/1999 | Duncan et al. ............. 395/842 |
| 5,956,477 A | 9/1999 | Ranson et al. ......... 395/183.06 |
| 5,978,874 A | 11/1999 | Singhal et al. .............. 710/107 |
| 5,978,902 A | 11/1999 | Mann ......................... 712/227 |
| 5,983,017 A | 11/1999 | Kemp et al. ................ 395/704 |
| 5,983,379 A | 11/1999 | Warren ....................... 714/727 |

\* cited by examiner

| INFORMATION | SIZE | DESCRIPTION |
|---|---|---|
| RDEST | 6 | INDICATES WHICH DESTINATION THIS INSTRUCTION WILL WRITE. |
| E1_RESULT | 1 | INDICATES E1 STAGE WILL WRITE THE DESTINATION |
| E2_RESULT | 1 | INDICATES E2 STAGE WILL WRITE THE DESTINATION |
| E3_RESULT | 1 | INDICATES E3 STAGE WILL WRITE THE DESTINATION |
| LSU | 1 | INDICATES IF THIS STAGE CONTAINS AN LSU INSTRUCTION |
| STORE | 1 | INDICATES IF THIS STAGE CONTAINS A STORE INSTRUCTION |
| FPU | 1 | INDICATES IF THIS STAGE CONTAINS AN FPU INSTRUCTION |
| IMU_MAC | 1 | INDICATES IF THIS STAGE CONTAINS AN IMU-FORWARDING MAC-TYPE or MULTIPLIER-TYPE INSTRUCTION |
| WRITE_RF | 1 | INDICATES THIS STAGE CONTAINS AN INSTRUCTION THAT UPDATES A REGISTER FILE |
| WRITE_FPR | 1 | INDICATES THIS STAGE CONTAINS AN INSTRUCTION THAT UPDATES A FLOATING POINT REGISTER FILE |
| SERIALIZE | 1 | INDICATES THIS STAGE CONTAINS A SERIALIZING INSTRUCTION |
| ARCH_RDEST | 1 | INDICATES THE LATEST INSTRUCTION THAT UPDATE AN ARCHITECTURAL REGISTER |
| ARCH_RDEST_SAVE | 1 | A FIELD FOR ARCH_DEST FOR HANDLING MISPREDICTED BRANCH |
| EXCEPTION | 1 | INDICATES IF THIS STAGE CONTAINS AN INSTRUCTION WITH AN EXCEPTION |
| PIPE FILE ENTRY | 2 | A POINTER TO WHICH PIPEFILE ENTRY HOLDS THE RESULT |
| VALID | 1 | INDICATES IF THE INSTRUCTION IN THIS STAGE IS VALID |

FIG. 7A

| INFORMATION | SIZE | DESCRIPTION |
|---|---|---|
| STAGE | 2 | INDICATES WHICH STAGE THE INSTRUCTION IS IN. |
| RDEST | 6 | INDICATES WHICH DESTINATION THIS INSTRUCTION WILL WRITE. |
| RDEST_VALID | 1 | INDICATES IF A DESTINATION WILL BE WRITTEN. |
| RDEST_CREG_VALID | 1 | INDICATES THAT THE DESTINATION IS A CONTROL REGISTER |
| STAGE_RDY | 2 | INDICATES WHICH STAGE WILL WRITE THE DESTINATION |
| LSU | 1 | INDICATES IF THIS STAGE CONTAINS AN LSU INSTRUCTION |
| BR | 1 | INDICATES IF THIS STAGE CONTAINS AN BR INSTRUCTION |
| IMU_STALL_MAC | 1 | INDICATES IF THIS STAGE CONTAINS AN IMU-FORWARDING MAC-TYPE INSTRUCTION |
| IMU_STALL_MUL | 1 | INDICATES IF THIS STAGE CONTAINS AN IMU-FORWARDING MUL-TYPE INSTRUCTION |
| EXCEPTION | 1 | INDICATES IF THIS STAGE CONTAINS AN INSTRUCTION WITH AN EXCEPTION |
| VALID | 1 | INDICATES IF THE INSTRUCTION IN THIS STAGE IS VALID |
| PIPE FILE ENTRY | 2 | A POINTER TO WHICH PIPEFILE ENTRY HOLDS THE RESULT |

MECHANISM FOR POWER EFFICIENT PROCESSING IN A PIPELINE PROCESSOR

BACKGROUND OF THE INVENTION

1. Field of the Invention

The present invention relates in general to microprocessors and, more particularly, to a system, method, and mechanism providing power efficient operation in a pipeline processor.

2. Relevant Background

Computer programs comprise a series of instructions that direct a data processing mechanism to perform specific operations on data. These operations including loading data from memory, storing data to memory, adding, multiplying, and the like. Data processors, including microprocessors, microcontrollers, and the like include a central processing unit (CPU) comprising one or more functional units that perform various tasks. Typical functional units include a decoder, an instruction cache, a data cache, an integer execution unit, a floating point execution unit, a load/store unit, and the like. A given program may run on a variety of data processing hardware.

Early data processors executed only one instruction at a time. Each instruction was executed to completion before execution of a subsequent instruction was begun. Each instruction typically requires a number of data processing operations and involves multiple functional units within the processor. Hence, an instruction may consume several clock cycles to complete. In serially executed processors each functional unit may be busy during only one step, and idle during the other steps. The serial execution of instructions results in the completion of less than one instruction per clock cycle.

As used herein the term "data processor" includes complex instruction set computers (CISC), reduced instruction set computers (RISC) and hybrids. A data processor may be a stand alone central processing unit (CPU) or an embedded system comprising a processor core integrated with other components to form a special purpose data processing machine. The term "data" refers to a digital or binary information that may represent memory addresses, data, instructions, or the like.

In response to the need for improved performance several techniques have been used to extend the capabilities of these early processors including pipelining, superpipelining, and superscaling. Pipelined architectures attempt to keep all the functional units of a processor busy at all times by overlapping execution of several instructions. Pipelined designs increase the rate at which instructions can be executed by allowing a new instruction to begin execution before a previous instruction is finished executing. A simple pipeline may have only five stages whereas an extended pipeline may have ten or more stages. In this manner, the pipeline hides the latency associated with the execution of any particular instruction.

The goal of pipeline processors is to execute multiple instructions per cycle (IPC). Due to pipeline hazards, actual throughput is reduced. Pipeline hazards include structural hazards, data hazards, and control hazards. Structural hazards arise when more than one instruction in the pipeline requires a particular hardware resource at the same time (e.g., two execution units requiring access to a single ALU resource in the same clock cycle). Data hazards arise when an instruction needs as input the output of an instruction that has not yet produced that output. Control hazards arise when an instruction changes the program counter (PC) because execution cannot continue until the target instruction from the new PC is fetched.

When hazards occur, the processor must stall or place "bubbles" (e.g., NOPs) in the pipeline until the hazard condition is resolved. This increases latency and decreases instruction throughput. As pipelines become longer, the likelihood of hazards increases. Hence, an effective mechanism for handling hazard conditions is important to achieving the benefits of deeper pipelines.

Another goal of many processors is to control the power used by the processor. Many applications, particularly those directed at mobile or battery operated environments, require low power usage. The execution pipelines of a computer consume a significant amount of power. Power consumption is largely caused by moving data between registers, files, and execution units. As data paths become wider, the power consumed to move the data increases.

Hence, in order to execute instructions efficiently at a high throughput within a pipeline it is important to coordinate and control the flow of instructions, operations, and data within the execution pipeline. The order and manner in which the operands and results of these instructions are made available to each other within the execution pipeline is of critical importance to the throughput of the pipeline.

SUMMARY OF THE INVENTION

The present invention involves a processor including a plurality of execution pipeline stages where each stage accepts a plurality of operand inputs and generates a result. A pipefile having at least the same number of entries as the number of execution pipeline stages is included in the processor. A pointer register is associated with each execution pipeline stage. A value is stored in at least one of the pointer registers, the value indicating a particular one of the entries in the pipefile.

The present invention involves a method, system and apparatus for forwarding data within a pipeline of a pipelined data processor having a plurality of execution pipeline stages where each stage accepts a plurality of operand inputs and generates a result. A pipefile is implemented having at least the same number of entries as the number of execution pipeline stages. Each new instruction is assigned to one of the entries in the pipefile before the new instruction is executed. The pipefile entry assignment remains valid while the instruction remains in any of the execution pipeline stages. The new instruction is passed through the execution pipeline stages to generate a result. Upon successful completion of executing the new instruction, the result is written back from the assigned pipefile entry to an architectural register.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Power efficient operation is an important feature for many data processors. This is particularly true for embedded processors so that they do not place undue demands on the power supply requirements for the system in which they are embedded. The present invention is illustrated in terms of a particular embedded processor system using a multi-stage pipeline for processing instructions. The present invention particularly involves a structure for efficiently forwarding data within the pipefile mechanism so that, for example, operands that are determined by a first instruction within the pipeline can be used by subsequent instructions before the first instruction has completed to write back.

Operand forwarding is important in avoiding pipeline stalls, but can lead to a significant amount of power loss as data is copied and moved between registers to make the data available throughout the pipeline. The power required is more significant when wide data words (e.g., 64-bit, 128-bit, or larger) are used. The present invention provides a mechanism that limits the need to copy data between registers within the pipeline.

The present invention implements a mechanism called a "pipefile" to improve power performance. Results from execution units are written on the results busses only once. They are captured by the pipefile which acts as a sort of cache. The results are forwarded as needed from the pipefile. A less efficient pipeline processor implementation simply moves the results from stage-to-stage through the execution pipeline without using a pipefile. However, since the results busses are heavily loaded due to the loads they are driving and parasitic impedance, driving the busses multiple times for the same interim result can be very power inefficient. Using the pipefile in accordance with the present invention, results from the execution stages need only be driven onto the results bus once.

In one implementation the pipefile mimics the pipeline and shifts the result from entry-to-entry as its producing instruction moves through the pipeline. This offers some improvement as the data is moved without the penalty of the heavily loaded results bus. In an improved implementation, once into the pipefile, a result stays in the entry until the instruction has completed and the result has been committed to the register file. The improved implementation avoids power loss associated with switching the transistor in the pipefile.

Figure 1:
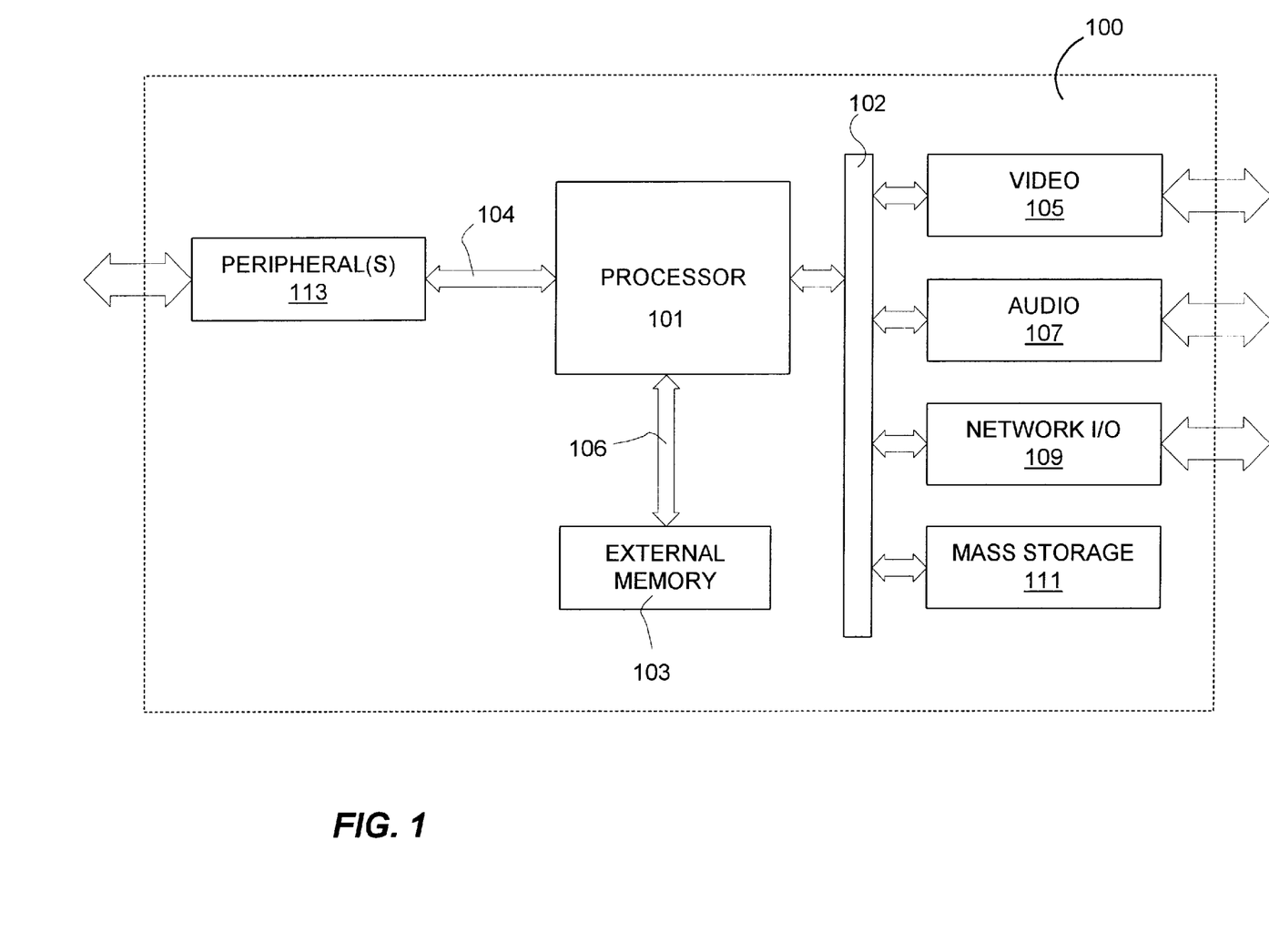
FIG. 1 shows in block diagram form a computer system incorporating an apparatus and system in accordance with the present invention.

Any system is usefully described as a collection of processes or modules communicating via data objects or messages as shown in FIG. 1. The modules may be large collections of circuitry whose properties are somewhat loosely defined, and may vary in size or composition significantly. The data object or message is a communication between modules that make up the system. To actually connect a module within the system it is necessary to define an interface between the system and the component module.

The present invention is illustrated in terms of a media system 100 shown in FIG. 1. Media processor 100 comprises, for example, a "set-top box" for video processing, a video game controller, a digital video disk (DVD) player, and the like. Essentially, system 100 is a special purpose data processing system targeted at high throughput multimedia applications. Features of the present invention are embodied in processor 101 that operates to communicate and process data received through a high speed bus 102, peripheral bus 104, and memory bus 106.

Video controller 105 receives digital data from system bus 102 and generates video signals to display information on an external video monitor, television set, and the like. The generated video signals may be analog or digital. Optionally, video controller may receive analog and/or digital video signals from external devices as well. Audio controller 107 operates in a manner akin to video controller 105, but differs in that it controls audio information rather than video. Network I/O controller 109 may be a conventional network card, ISDN connection, modem, and the like for communicating digital information. Mass storage device 111 coupled to high speed bus 102 may comprise magnetic disks, tape drives, CDROM, DVD, banks of random access memory, and the like. A wide variety of random access and read only memory technologies are available and are equivalent for purposes of the present invention. Mass storage 111 may include computer programs and data stored therein. In a particular example, high speed bus 102 is implemented as a peripheral component interconnect (PCI) industry standard bus. An advantage of using an industry standard bus is that a wide variety of expansion units such as controller's 105, 107, 109 and 111 are readily available.

Peripherals 113 include a variety of general purpose I/O devices that may require lower bandwidth communication than provided by high speed bus 102. Typical I/O devices include read only memory (ROM) devices such as game program cartridges, serial input devices such as a mouse or joystick, keyboards, and the like. Processor 101 includes corresponding serial port(s), parallel port(s), printer ports, and external timer ports to communicate with peripherals 113. Additionally, ports may be included to support communication with on-board ROM, such as a BIOS ROM, integrated with processor 101. External memory 103 is typically required to provide working storage for processor 101 and may be implemented using dynamic or static RAM, ROM, synchronous DRAM, or any of a wide variety of equivalent devices capable of storing digital data in a manner accessible to processor 101.

Figure 2:
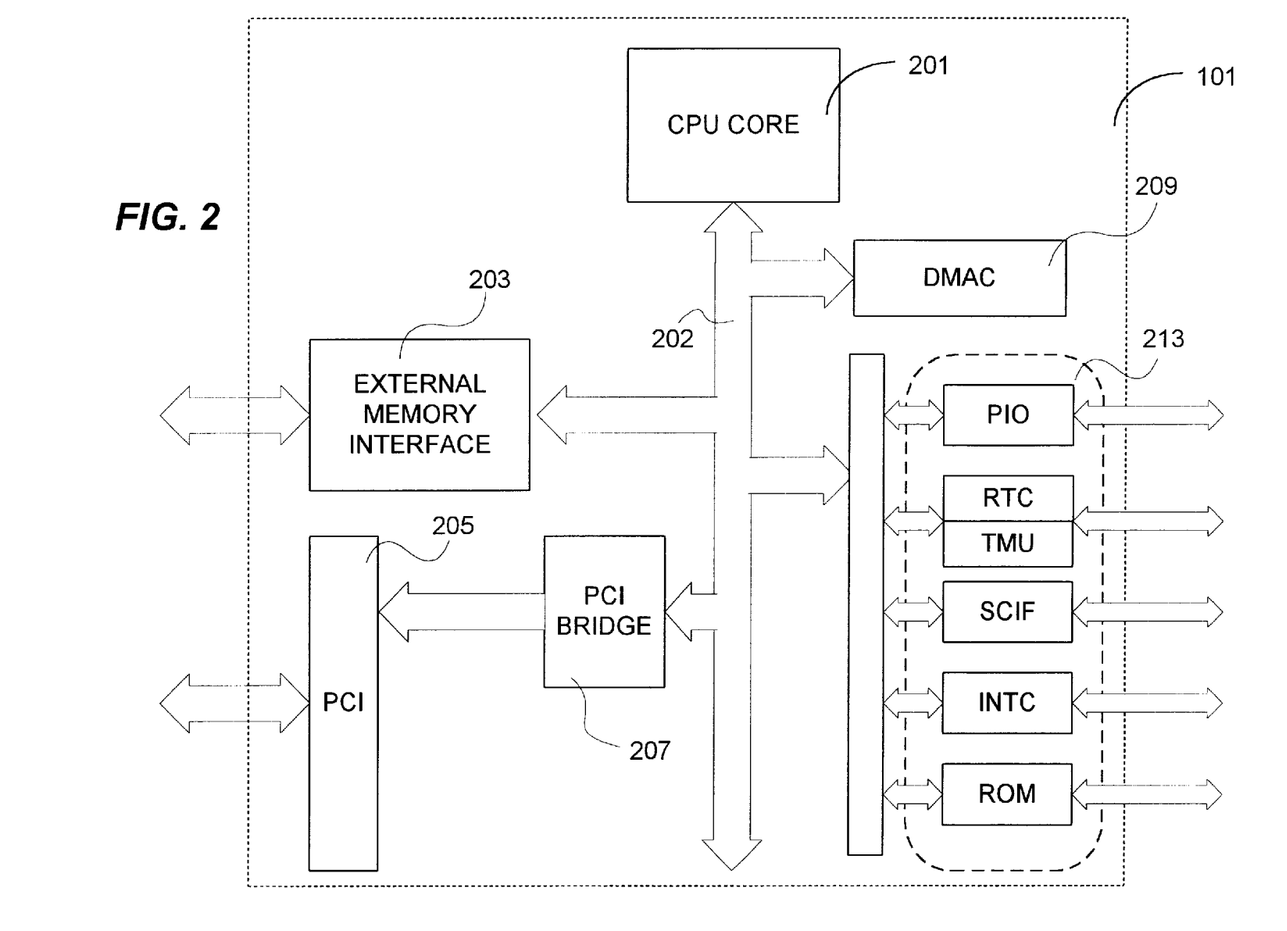
FIG. 2 shows a processor in block diagram form incorporating the apparatus and method in accordance with the present invention.

Processor 101 is illustrated in a greater detail in the functional diagram of FIG. 2. One module in a data processing system is a central processor unit (CPU) core 201. The CPU core 201 includes, among other components execution resources (e.g., arithmetic logic units, registers, control logic) and cache memory. These functional units, discussed in greater detail below, perform the functions of fetching instructions and data from memory, preprocessing fetched instructions, scheduling instructions to be executed, executing the instructions, managing memory transactions, and interfacing with external circuitry and devices.

CPU core 201 communicates with other components shown in FIG. 2 through a system bus 202. In the preferred implementation system bus 202 is a high-speed network bus using packet technology and is referred to herein as a "super highway". Bus 202 couples to a variety of system components. Of particular importance are components that implement interfaces with external hardware such as external memory interface unit 203, PCI bridge 207, and peripheral bus 204.

The organization of interconnects in the system illustrated in FIG. 2 is guided by the principle of optimizing each interconnect for its specific purpose. The bus system 202 interconnect facilitates the integration of several different types of sub-systems. It is used for closely coupled sub-systems which have stringent memory latency/bandwidth requirements. The peripheral subsystem bus 204 supports bus standards which allow easy integration of hardware of types indicated in reference to FIG. 1 through interface ports 213. PCI bridge 207 provides a standard interface that supports expansion using a variety of PCI standard devices that demand higher performance that available through peripheral port 204. The system bus 202 may be outfitted with an expansion port which supports the rapid integration of application modules without changing the other components of system 101. External memory interface 203 provides an interface between the system bus 202 and the external main memory subsystem 103 (shown in FIG. 1). The external memory interface comprises a port to system bus 202 and a DRAM controller.

Figure 3:
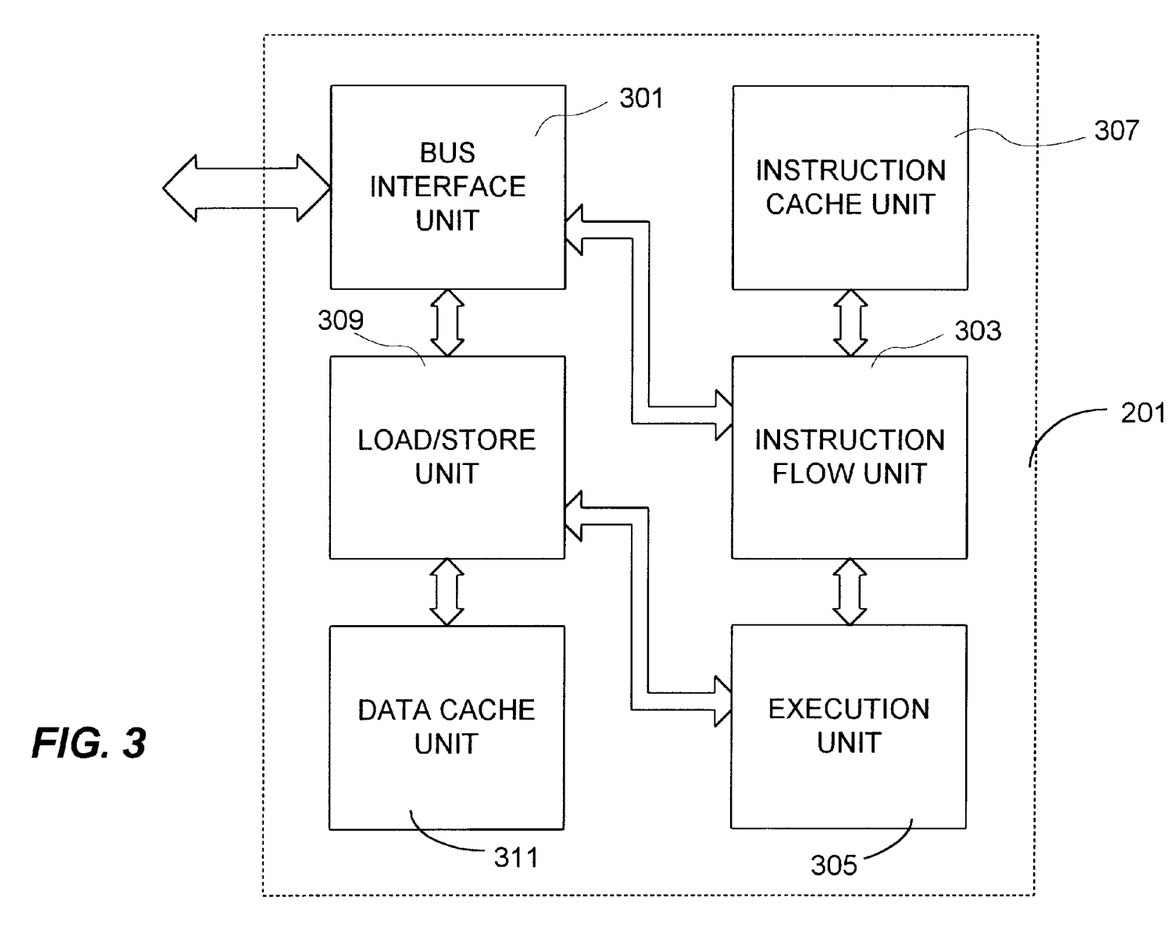
FIG. 3 illustrates a CPU core useful in the implementation of the processor and system shown in FIG. 1 and FIG. 2 in accordance with the present invention.

The CPU core 201 can be represented as a collection of interacting functional units as shown in FIG. 3. These functional units, discussed in greater detail below, perform the functions of fetching instructions and data from memory, preprocessing fetched instructions, scheduling instructions to be executed, executing the instructions, managing memory transactions, and interfacing with external circuitry and devices.

A bus interface unit (BIU) 301 handles all requests to and from the system bus 202 and external memory. An instruction flow unit (IFU) 303 is the front end of the CPU pipe and controls fetch, predecode, decode, issue and branch operations in the preferred embodiment. In accordance with the preferred embodiment, IFU 303 includes a pipe control unit 401 (shown in FIG. 4) that implements features of the present invention. However, it is contemplated that the inventive features of the present invention may be usefully embodied in a number of alternative processor architectures that will benefit from the performance features of the present invention. Accordingly, these alternative embodiments are equivalent to the particular embodiments shown and described herein.

An execution unit (IEU) 305 handles all integer and multimedia instructions. The main CPU datapath includes an instruction cache unit (ICU) 307 implements an instruction cache (Icache not shown) and an instruction translation lookaside buffer (ITLB, not shown). Load store unit (LSU) 309 handles all memory instructions. A data cache control unit (DCU) 311 includes a data cache (Dcache, not shown) and a data translation lookaside buffer (DTLB, not shown). Although the present invention preferably uses separate data and instruction caches, it is contemplated that a unified cache can be used with some decrease in performance. In a typical embodiment, the functional units shown in FIG. 2, and some or all of cache memory 105 may be integrated in a single integrated circuit, although the specific components and integration density are a matter of design choice selected to meet the needs of a particular application.

Figure 4:
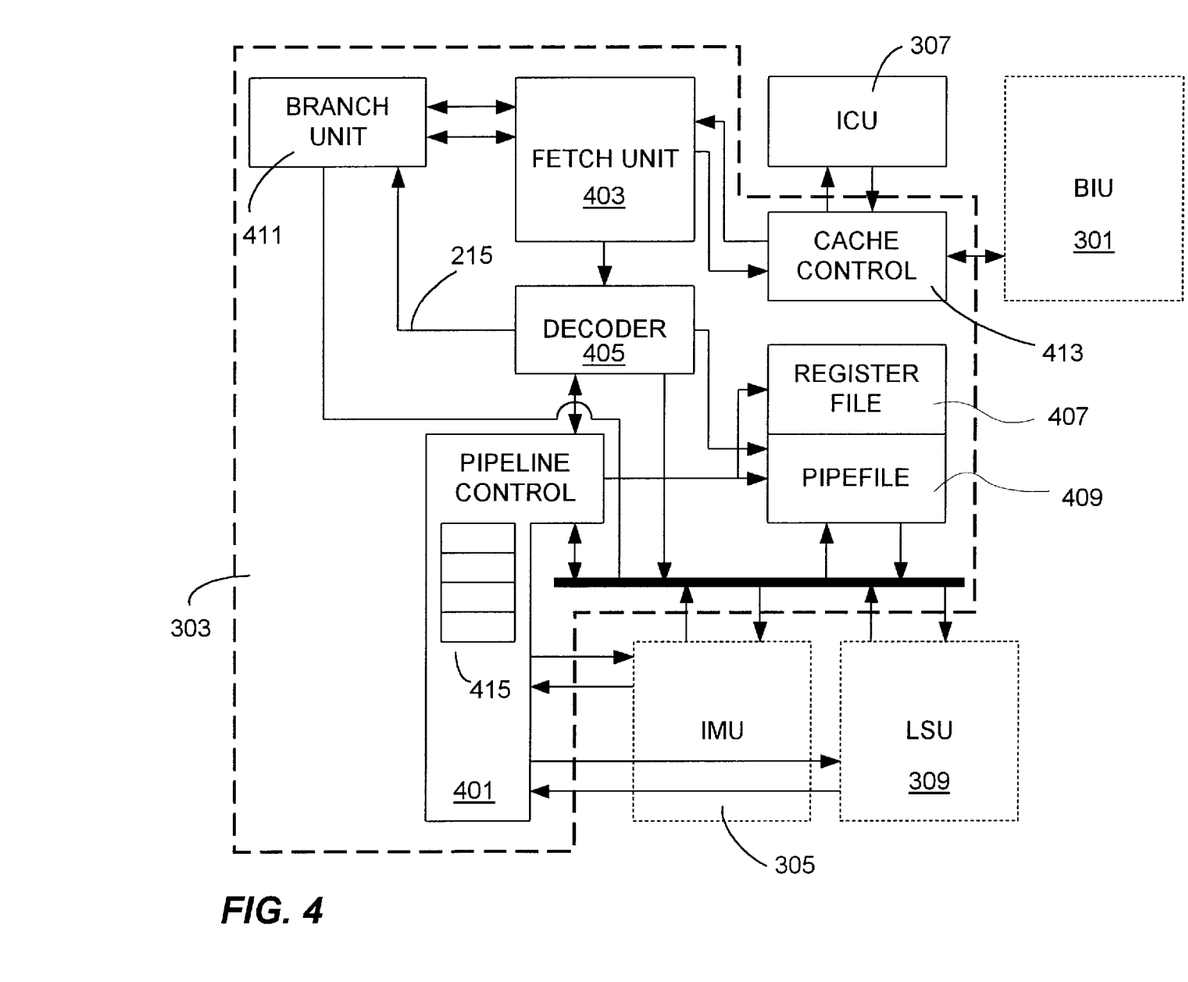
FIG. 4 shows an instruction fetch unit in which features of the present invention are embodied in a particular implementation.

FIG. 4 shows hardware resources within IFU 303 including a pipe control unit 401 in accordance with the present invention. FIG. 4 shows a simplified IFU block diagram with the internal blocks as well as the external interfacing units. As shown in FIG. 4, IFU 303 can be divided into the following functional blocks according to their functions: the Instruction Cache Control Unit (ICC) 413, the Fetch Unit (FE) 403, the Branch Unit (BR) 411, the Decode Unit 405, the Pipe Control Unit 401, and the Operand File Unit comprising register file 407 and pipe file 409.

IFU 303 functions as the sequencer of the CPU core 201 in accordance with the present invention. It coordinates the flow of instructions and data within the core 201 as well as merges the external events with the core internal activities. Its main functions are to fetch instructions from ICU 307 using fetch unit 403 and decode the instructions in decoder 405. IFU 303 checks for instruction inter-dependency, reads the operands from the register file 407 and sends the decoded instructions and the operands to the execution units (e.g., IEU 305, and LSU 309). In addition, IFU 303 couples to BIU 301 on instruction cache misses to fill the instruction cache within ICU 307 with the missing instructions from external memory.

Because of the sequencing role within the CPU core 201, IFU 303 interfaces with almost every other functional unit. The interface between IFU 303 and BIU 301 initiates the loading of instructions into the instruction cache. The interface between IFU 303 and ICU 307 provides the flow of instructions for execution. The interface between IFU 303 and IMU 305 and LSU 309 provides the paths for sending/receiving instructions, operands, results, as well as the control signals to enable the execution of instructions. In addition to these interfaces, IFU 303 may also receive external interrupt signals from an external interrupt controller (shown in FIG. 2), which samples and arbitrates external interrupts. IFU 303 will then arbitrate the external interrupts with internal exceptions and activates the appropriate handler to take care of the asynchronous events.

Once instructions are decoded, pipe control unit 401 monitors their execution through the remaining pipe stages. The main function of pipe control unit 401 is to ensure that instructions are executed smoothly and correctly that (i) instructions will be held in the decode stage until the source operands are ready or can be ready when needed, (ii) that synchronization and serialization requirements imposed by the instruction as well as internal/external events are observed, and (iii) that data operands/temporary results are forwarded correctly.

The operand file unit implements the architecturally defined general purpose register file 407. In addition, it also implements a limited version of a reorder buffer called "pipe file" 409 for storing and forwarding temporary results that are yet to be committed to architectural registers. Because CPU core 201 is principally directed at in-order execution, there is only a small window of time that execution results may be produced out-of-order. The present invention takes advantage of this property and implements a simplified version of the reorder buffer that allows temporary results to be forwarded as soon as they are produced, while avoiding the expensive tag passing/matching mechanism usually associated with a reorder buffer. The operand file implements the data path portion of this pipe file. The control is implemented in the pipe control unit 401.

Pipe file 409 operates to collect results from the execution units, and writes them back to the register file 407 during the writeback stage. Pipe file 409 is an important component of the present invention. One option for using pipe file 409 is to have a pipe file entry associated with each execution stage. This requires that interim results determined at an early execution stage be copied from entry-to-entry within pipefile 409 so that the interim result follows the instruction through the pipeline. The present invention involves a mechanism and method of operation that avoids this entry-to-entry data shifting. These features are described in greater detail hereinafter with respect to FIG. 9.

Figure 5:
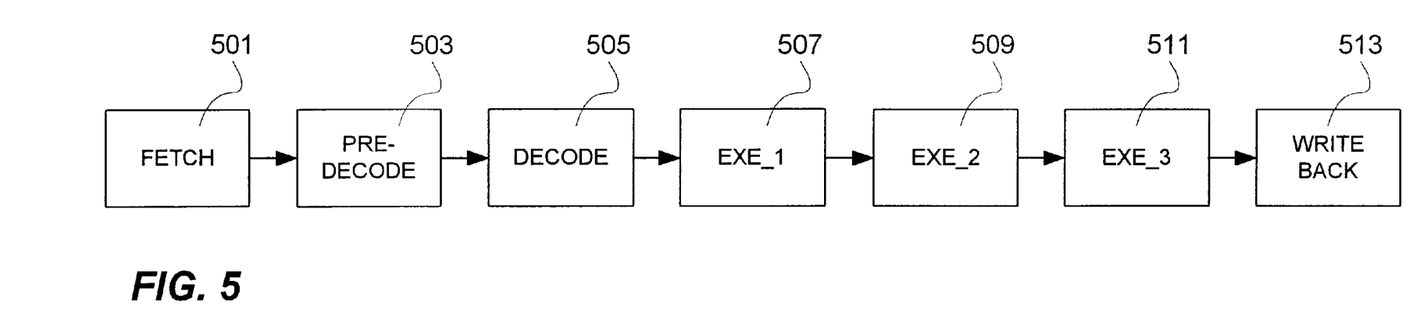
FIG. 5 illustrates an exemplary execution pipeline in accordance with a specific embodiment of the present invention.
Figure 6:
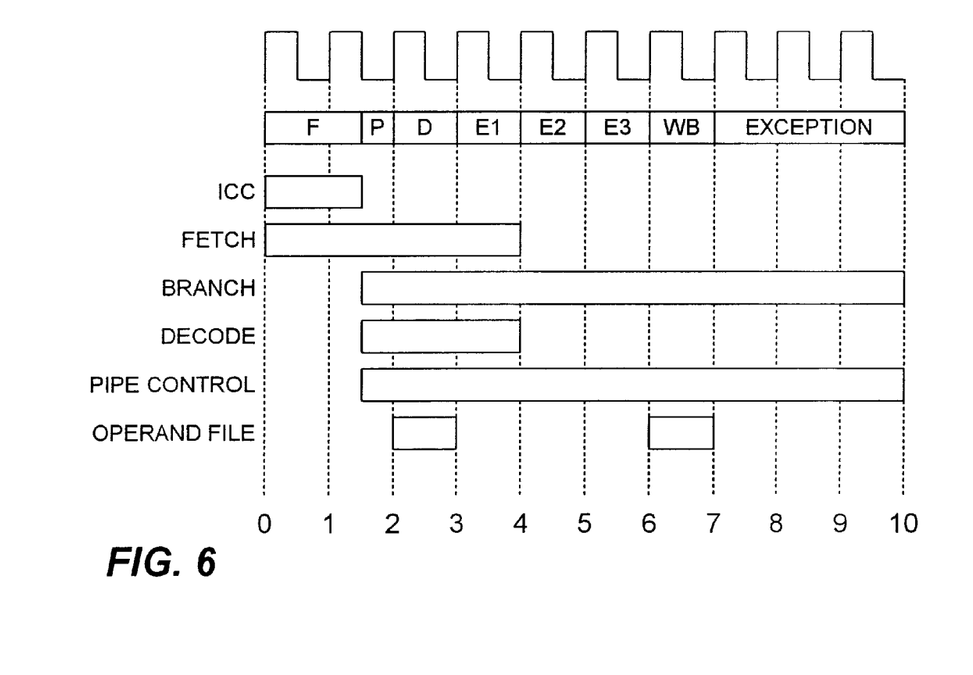
FIG. 6 illustrates comparative pipeline timing for the execution pipeline shown in FIG. 5.

FIG. 5 and FIG. 6 illustrate an example execution pipeline in accordance with the present invention. The particular example is a scalar (i.e., single pipeline), single issue machine. The implementation in FIG. 5 and FIG. 6 includes three execution stages. Many instructions however execute in a single cycle. The present invention implements features to enable comprehensive forwarding within the pipeline to achieve a high instruction throughput. Although illustrated in terms of a single pipeline (i.e., scalar) machine, the teachings of the present invention are adapted to multiple pipeline machines in a straightforward manner.

In the pre-decode stage 503 the instruction cache access which was initiated in the previous cycle is completed and the instruction is returned to IFU 303 where it can be latched by mid-cycle. An instruction may spend from 1 to n cycles in stage 503 depending on downstream pipeline instructions. In the second half of stage 503, some pre-decoding of the instruction will be carried out. Decode stage 505 handles the full instruction decode, operand dependency checks and register file read and instruction issue to the execution units.

The first execution stage 507 implements the execution of all single cycle integer instructions as well as the address calculation for memory and branch instructions. The second execution stage 509 implements the second cycle of execution for all multicycle integer/multimedia instructions. Additionally it corresponds to the second cycle for load instructions. The third execution stage 511 implements the third cycle of execution for all multicycle integer/multimedia instructions and corresponds to the completion cycle for load instructions. Write back stage 513 is where all architectural state modified by an instruction (e.g. general purpose register, program counter etc.) is updated. The exception status of the instruction arriving in this stage or any external exception can prevent the update in this stage.

Figure 7A:
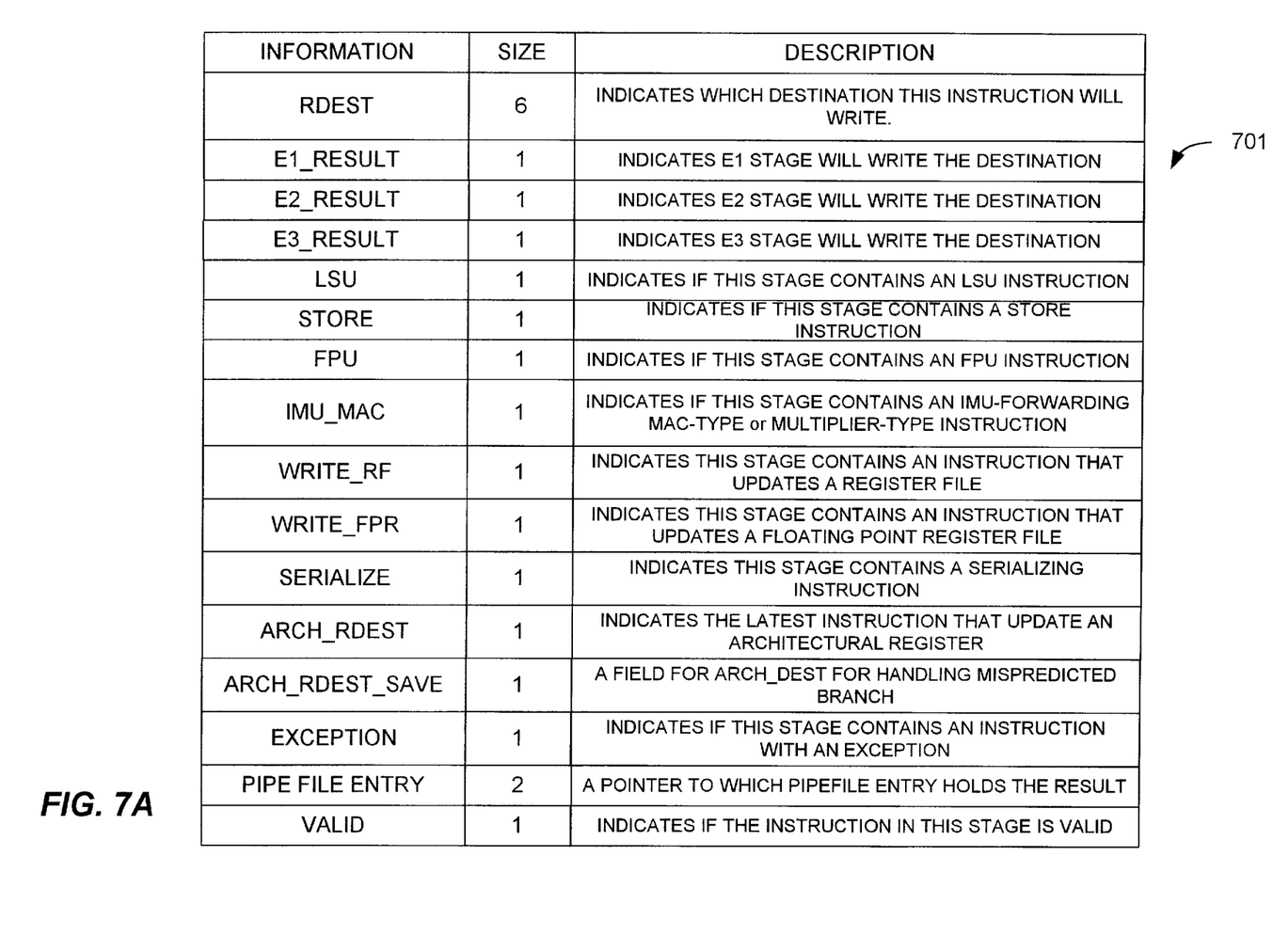
FIG. 7A and FIG. 7B show exemplary a snapshot register entries in accordance with embodiments of the present invention.

The pipe control unit 401 performs a number of operations in handling the instruction flow. An important feature of the pipe control unit 401 is the pipeline snapshot file 415 (shown in FIG. 4) implemented within pipe control unit 401. Snapshot file 415 may be implemented as a lookup table having a table entry 701 (shown in FIG. 7) corresponding to each execution stage in the pipeline. The snapshot file 415 provides a central resource for all pipeline control operations such as dependency checks, operand forwarding, exception handling, and the like. In a particular implementation, snapshot file 415 includes four entries corresponding to the three execution pipeline stages and the writeback pipeline stage.

Figure 7B:
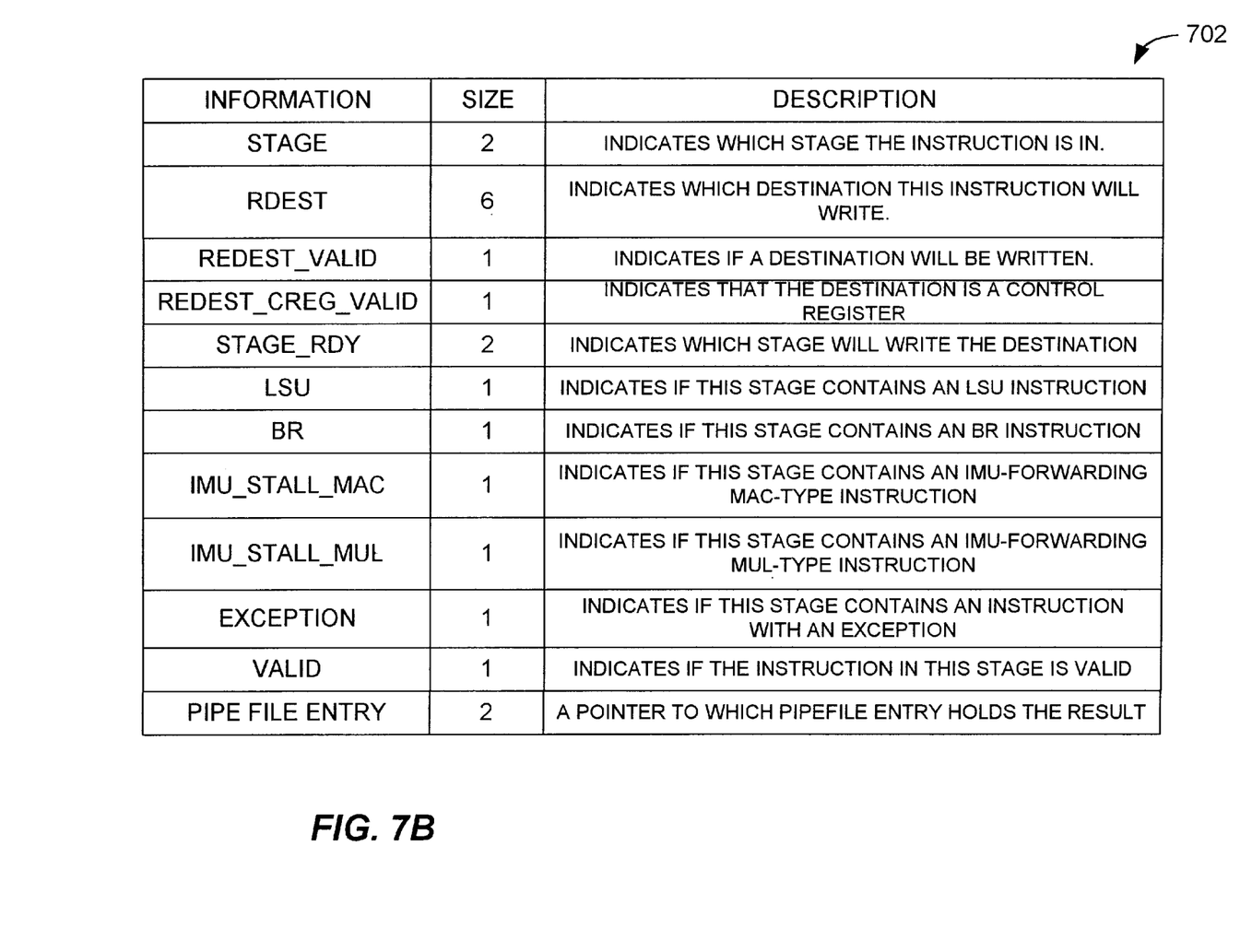

FIG. 7A and FIG. 7B show exemplary snapshot files 701 and 702 indicating entries holding metadata describing the instruction execution state at the corresponding pipe stage. As instructions move from one stage to another, their associated snapshot entry moves to the corresponding snapshot entry 701 or 702. The contents of each snapshot entry 701 may be varied to meet the needs of a particular application. The specific examples shown in FIG. 7 correspond to pipeline control operations described hereinbelow. The essential functionality of examples 701 and 702 are similar although the implementation of that essential functionality differs between the examples. In comparing the examples, snapshot file 701 does not include a "STAGE" entry as that is implied by the index of the entry whereas example 702 includes an explicit STAGE entry. The single STAGE_RDY entry of FIG. 7B is implemented using three separate entries (E1_RESULT, E2_RESULT and E3_RESULT) in the example of FIG. 7A. The fields have the function generally described in the figures and additional or fewer fields may be added to meet the needs of a particular application.

In particular, snapshot entry 701 includes a pointer to the pipefile entry corresponding to that instruction. An instruction is assigned an entry in pipefile 409 in decode and the assigned value indicated in the instruction's pipefile entry 701. Other execution stages or hardware resources that desire to know which pipefile stage is being used by the instruction can look to the snapshot entry 701 for that information. In the particular example there are three pipefile entries corresponding to the three execution stages of the pipeline. Hence, only two bits of information are needed to point to the correct pipefile entry.

As an instruction moves through the pipeline, and results become available, the results are written to the specified pipe file entry in the execution stage indicated by the "stage_rdy" field in snapshot entry 702. Subsequently, the result remains in the same pipefile entry while the instruction moves through the pipeline. In this manner the present invention avoids power usage normally required to move the result from entry to entry within pipefile 409. Instead, only the two-bit pointer needs to be moved from entry to entry within snapshot entry 701 and 702. This can translate to hundreds or thousands of fewer transistor switching operations per clock cycle for a wide data word.

In operation, the snapshot register may be used by the pipe control unit 401 to perform a number of parallel checks to classify the instruction currently being processed by the decoder 405. For example, the three potential operand register fields of the instruction word are checked against the existing pipe snapshot to detect data dependency, forwarding dependence, write after write hazard, and write after write for an accumulating-type instruction.

Under normal conditions once an instruction has been issued to an execution unit its entry will progress through each stage of the snapshot file on each clock edge. At the beginning of each execution stage the control for writing the result to the pipefile is generated. This is determined by checking the E1_RESULT, E2_RESULT, and E3_RESULT fields of the current execution stage. For example, if E1_RESULT field is set for the instruction executing in the EXE_1 stage 507, the result from EXE_1 stage 507 will then be written into the pipefile entry indexed by the PIPE_FILE_ENTRY field. Similarly, the result from the EXE_2 and EXE_3 stages will be written into the pipefile 409 when the E2_RESULT and E3_RESULT fields of the corresponding snapshot file entries are set. The write into pipefile 409 will occur even if the EXCEPTION field in snapshot file 702 is set. This is to allow transportation data for exceptions back to the branch unit. Once an instruction reaches write-back, the rdest_valid field also determines if the contents of the pipefile is written back to the architectural register file. Once in write-back, if no exception has occurred, the instruction has completed.

The snapshot register plays a role in managing pipefile 409 and operand file 407 updates in the event of exceptions. Even though an exception has been detected the pipefile 409 will continue to be updated with data according to the "stage_rdy" field of the snapshot file. While an excepting instruction is executing through the pipe, in certain cases the result data associated with the excepting data is of interest.

A key point is that these results are written to pipefile 409 in the normal stage_rdy stage of the excepting instruction. As long as this rule is honored exception data is transported through the pipefile 409 as normal and will indicate to the branch unit 411 at write-back that exception data of interest is on the write-back bus.

Another general utility of the snapshot register is in handling internal operand forwarding within the pipeline. Because the snapshot entry 701 indicates which pipestage will produce a result to the pipefile 409, subsequent instructions can reliably use the interim result from the pipefile 409 before the interim result is committed to architectural state. This process is called internal operand forwarding. The present invention supports internal operand forwarding by providing a pipefile entry from which the interim result can be readily forwarded.

When decode indicates that it has a valid instruction the pipe control block determines from the instruction code the source of the operands for the instruction. The operand can be sourced from, for example:

Register operands;

Indirectly forwarded operands through the three pipefile entries;

Directly forwarded operands from the result busses;

The extended immediate field from the instruction;

The program counter;

The contents of an instruction address register (IAR);

The contents of a control register; and

Figure 8:
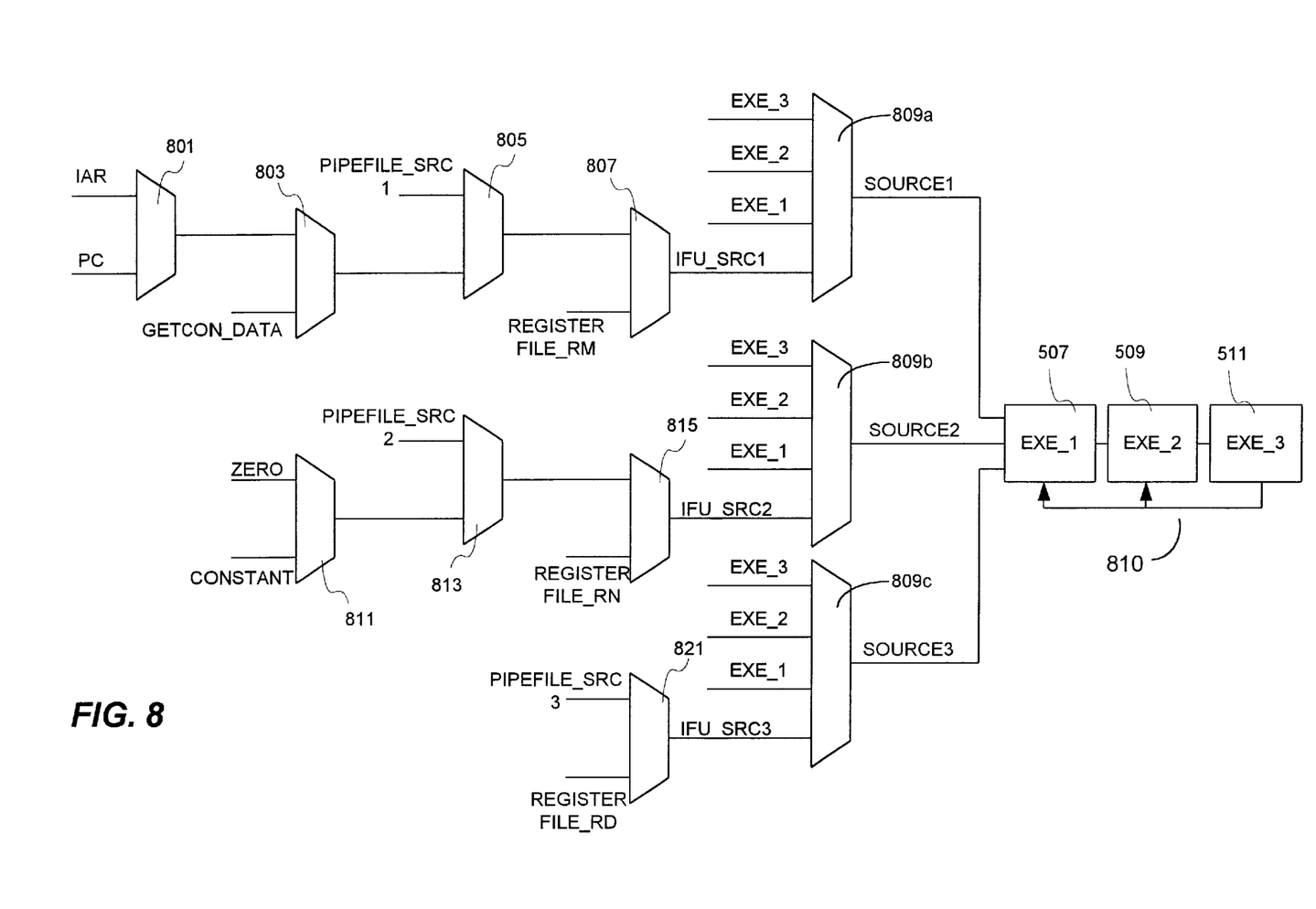
FIG. 8 shows an operand multiplexing mechanism in accordance with an embodiment of the present invention.

A tied low constant field;

The above gives up to 12 possible sources of input to some operand. FIG. 8 illustrates an exemplary operand multiplexing ("muxing") mechanism that enables rich sharing of operands within the pipeline. The mechanism shown in FIG. 8 is distributed throughout pipe control unit 401 as described below. The operand multiplexor mechanism of FIG. 8 produces three choices (e.g., IFU_SRC1, IFU_SRC2, IFU_SRC3) for the source operands provided to the first execution stage 507. Each execution stage produces a result (labeled EXE_1, EXE_2, and EXE_3 in FIG. 8) that may be used as a source operand input to the first execution stage 507. Execution stage 507 is associated with a multiplexors 809a–809c for selecting up to three source operands from those available. The specific examples given herein are for purposes of explanation and understanding, and are not a limitation on the actual implementation.

It should also be understood that execution stage 507, 509 and 511 shown in FIG. 8 are representative of all of the hardware resources used in that execution stage as defined by the processor microarchitecture. An execution stage is physically implemented using the hardware resources such as those shown in FIG. 3. The outputs of multiplexors 809 are physically coupled to each of the hardware resources that will use the source operands during its operation.

The multiplexing of these operand sources in the particular example is distributed in the following way:

The program counter (PC), instruction address registers, and control register contents are pre-muxed in the branch unit using multiplexors 801 and 803. All these inputs are available at the start of the cycle.

The decode constant extracted from the instruction and possibly tied high zeroes are pre-muxed in the decode stage using multiplexor 811.

The outputs of the pipefile 409 are muxed with the program counter data and decode constant data respectively in multiplexors 805 and 813.

The register file contents are muxed with the pipefile outputs using multiplexors 807, 815, and 821 to produce source operands which are distributed down the execution datapath (IFU_SRC1, IFU_SRC2, IFU_SRC3 in FIG. 8).

Forwarding of completing results is done locally within the execution datapath as suggested by the connection from the output of EXE_3 stage to the input of multiplexor 809. As the result is being driven back up the datapath from the various stages of execution (imu_result_ex1, _ex2 and _ex3), the result taps back into the multiplexor 809 latch at the input to the execution sub-units. The result is also driven back up to the pipefile for ultimate storage in the register file. Pipe control unit 401 controls the selection of the multiplexor 809 latches.

The LSU ex3 result is muxed with the output of the IMU ex3 result (from the multiplier). This is also controlled by the pipe control unit 401.

In this manner, pipe control unit 401 generates the control signals for multiplexors and execution stage resources. This enables the source operand inputs used by each execution stage to be selected from among a plurality of possible inputs. Of particular significance is that each source operand can be forwarded from the interim results stored in the pipefile if valid results are available in the pipefile. This is useful in handling data hazards in a manner that limits the need to stall the pipeline or fill the pipeline with bubbles while data dependencies resolve. The particular choice and distribution of operand sources can include more or fewer sources to meet the needs of a particular application and unless specified otherwise herein the examples are provided for example purposes only.

Moreover, each source operand is desirably allowed to be taken from the execution unit's own result output. This is particularly useful for accumulate-type operations where the destination register is used in a series of instructions to hold an accumulating result. Without this feature, pipeline bubbles would likely be inserted between accumulate instructions thereby reducing throughput significantly. Using this feature, the decoder can issue accumulating type instructions one-after-another.

Figure 9:
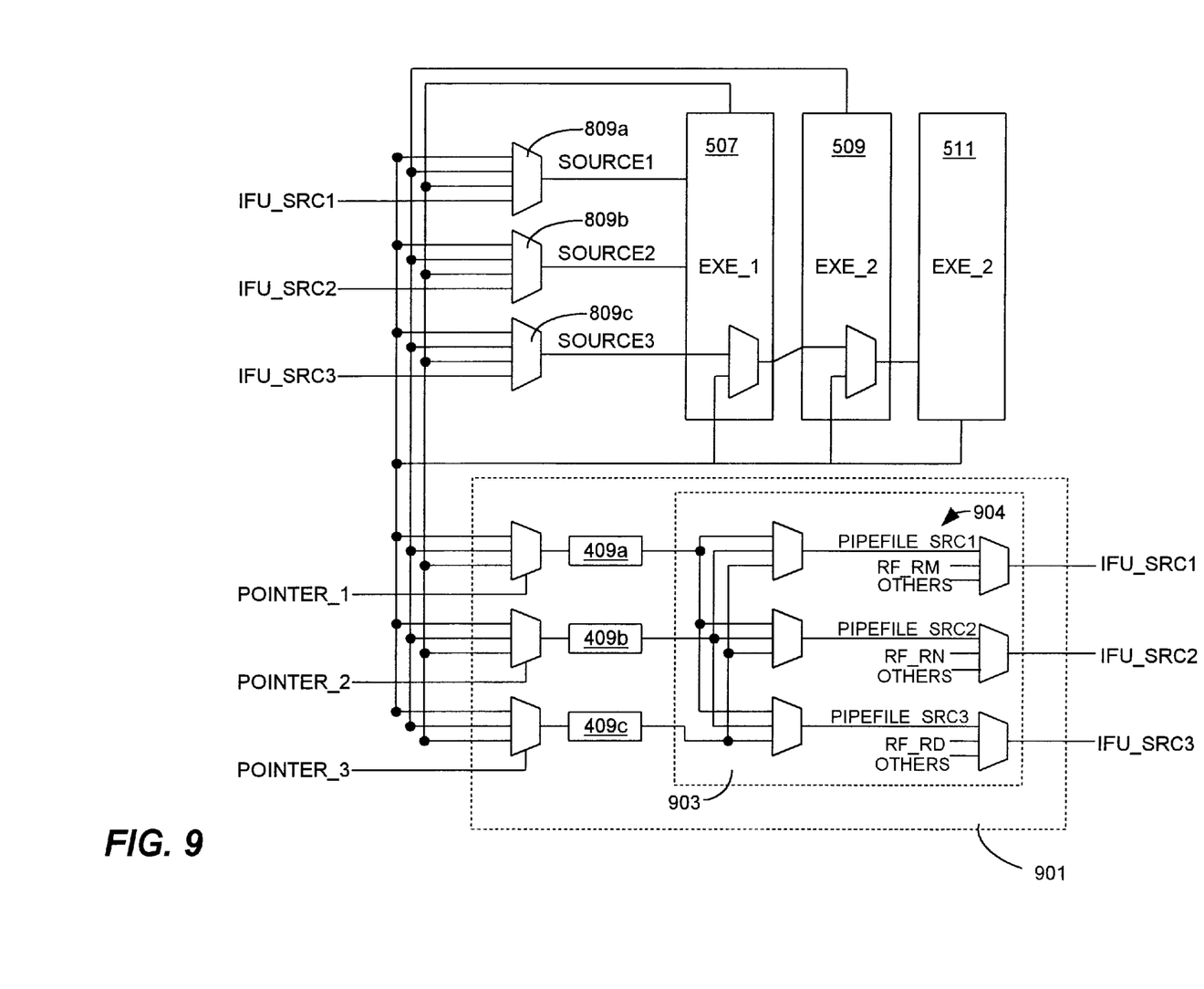
FIG. 9 schematically illustrates internal operand forwarding mechanism in accordance with the present invention.

FIG. 9 that schematically illustrates the execution stages of a pipeline and the operand sources for each stage. Each execution stage (EXE_1, EXE_2 and EXE_3) may generate a result. The specific stage that generates a result for any given instruction will vary from instruction-to-instruction, but is preferably indicated in the "stage_rdy" field of the snapshot file entry 702 or the E1_RESULT, E2_RESULT and E3_RESULT fields described hereinbefore. Each source operand can be taken from the execution unit's own result output. FIG. 9 shows an operand bus comprising IFU_SRC1, IFU_SRC2 and IFU_SRC3 (determined as shown in FIG. 8) and a results bus comprising EXE_1_RESULT, EXE_2_RESULT and EXE_3_RESULT. The results bus carries results to appropriate entries in pipefile 409.

In the embodiment shown in FIG. 9 each execution stage corresponds to a specific entry in the pipe file 409 (e.g., EXE_2 corresponds to pipefile entry 409A, EXE_3 stage 509 corresponds to entry 409B). Results are written from the result bus into pipefile 409 according to the "stage_rdy" value in the snapshot register (FIG. 7A) or the E1_RESULT through E3_RESULT entries (FIG. 7B) as described hereinbefore. Pipefile 409A takes the EXE_1 result and can forward its contents when the instruction that produces the result is in the EXE_2 stage. Similarly, pipefile entry 409B takes the EXE_2 result and 409C takes the EXE_3 result respectively. Otherwise, results are moved sequentially from entry 409A to 409B to 409C. Entry 409C corresponds to the write back pipe stage. Assuming the snapshot register entry 701 corresponding to the instruction in the write back stage is valid and does not indicate an exception, the value stored in pipefile stage 409 is copied to the appropriate register in register file 407.

Significantly, the operands for each execution stage can be selected from either the operand bus or the results bus. Hence, a result that is ready in EXE_1 will be driven onto the EXE_1_RESULT line and can be used as an operand on the following cycle in the second and third execution stages before being written to either register file 407 or the pipefile 409. Similarly, a result determined in EXE_3 can be used on the next clock cycle as an operand for an instruction executing in the first execution stage (EXE_1). This enables the instruction to be issued to EXE_1 without delays or pipeline bubbles normally associated with waiting for the EXE_3_RESULT to be written out to a register or rename register.

Furthermore, execution stage 507 can use its own output as well as the outputs of stages 509 and 511 as an operand for the next cycle. This is done, for example, by selecting EXE_1_RESULT, EXE_2_RESULT or EXE_3_RESULT as one of its operand inputs. This is particularly useful for accumulate-type operations where the destination register is used in a series of instructions to hold an accumulating result. Without this feature, pipeline bubbles would likely be inserted between accumulate instructions thereby reducing throughput significantly. Using this feature, the decoder can issue accumulating type instructions one-after-another.

The results are coupled to a corresponding selector unit 901. Each selector selectively couples the result to one of the result bus lines. Each selector is controlled by, for example, the pointer value (labeled POINTER_1, POINTER_2 and POINTER_3 in FIG. 9) corresponding to that pipe stage. The pointer values are determined from the PIPE_FILE_ENTRY and E1_RESULT, E2_RESULT and E3_RESULT fields of snapshot entry 701. Alternatively, the pointer value 903 may be stored in the snapshot file entry 701 as described hereinbefore, or may be stored in a separate register that operates in a manner such that the pointer value remains associated with a particular instruction as the instruction moves through the pipeline. The result is written to the specified pipefile entry 409a–409c.

Pipefile 409 preferably comprises dual ported memory structure so that the contents of any entry 409a–409c can be written to and/or read out at any time. The memory within pipefile 409 is typically implemented using CMOS or BiCMOS static random access memory (SRAM) technology using four or more transistors per stored bit. A multiplexor set 903 selectively couples the data stored in pipefile entries 409a–409c to appropriate lines on a pipefile bus 904. The pipefile bus 904 provides values to the multiplexing mechanism shown in FIG. 8, for example. Multiplexor set 903 is controlled by pipe control unit 401 to couple appropriate bus lines to corresponding entries 409a–409c in pipefile 409.

As a particular example, assume an instruction that generates its result in EXE_1 and the pointer values are set such that the EXE_1 result is written to pipefile entry 409b. From pipefile entry 409b the result can be multiplexed onto any of the IFU_SRC lines by appropriate settings in multiplexor set 903. On the next pipe cycle, the example instruction will move to pipe stage EXE_2, while pipefile entry 409b remains unchanged. In this manner, a result needs only be written to the results bus one time while remaining continuously available for forwarding while the instruction remains in the pipeline. the hundreds of transistors used to store the value in entry 409b do not have to be switched until after the value is written back and the pipe file entry is reassigned to an instruction in the decoder.

It is contemplated that the functionality of multiplexor 903 may be implemented in a variety of ways depending on the level of operand forwarding needed in a particular implementation. For example, if operand forwarding from the pipefile is not needed, there would be no corresponding need to generate the PIPEFILE_SCR1, PIPEFILE_SCR2 and PIPEFILE_SCR3 lines. The writeback line is controlled by the writeback stage pointer and selects one of the pipefile entries for writeback to an architectural register in register file 407.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

What is claimed is:

1. A method for forwarding data within a pipeline of a pipelined data processor comprising the steps of:

providing a plurality of execution pipeline stages where each stage accepts a plurality of operand inputs and generates a storable result;

providing a pipefile comprising at least the same number of entries as the number of execution pipeline stages;

assigning each new instruction to one of the entries in the pipefile before the new instruction is executed, wherein the pipefile entry assignment remains valid while the instruction remains in any of the execution pipeline stages;

passing the new instruction through the execution pipeline stages to generate a result;

storing the result in the assigned pipefile entry;

providing the assigned pipefile entry to selected ones of the plurality of execution pipeline stages; and upon successful completion of executing the new instruction, writing back the result from the assigned pipefile entry to an architectural register.

2. The method of claim 1 further comprising selectively coupling the result generated by each execution pipeline stage to an operand input of one of the execution pipeline stages.

3. The method of claim 1 wherein the step of assigning is performed at a decode stage before the new instruction is passed though any of the execution pipeline stages.

4. The method of claim 1 wherein the assigning is performed so that each instruction in each execution pipeline stage is assigned to a unique one of the pipefile entries.

5. The method of claim 1 wherein the execution pipeline stages comprise a write back pipeline stage, the write back pipeline stage having an instruction therein assigned to one of the pipefile entires, and the assigning further comprises assigning the new instruction to the pipefile entry currently being used by the write back pipeline stage.

6. The method of claim 1 further comprising:
providing a pointer register associated with each execution pipeline stage; and
storing in each pointer register a value indicating the pipefile entry assigned to the instruction currently in the associated execution pipeline stage.

7. The method of claim 6 further comprising moving the value stored in each pointer register to another pointer register at each cycle of the pipeline so that the value is always stored in a pointer register associated with the instruction to which the pipefile entry identified by the value is assigned.

8. A data processor comprising:
a plurality of execution pipeline stages where each stage accepts a plurality of operand inputs and generates a storable result;
a pipefile comprising at least the same number of entries as the number of execution pipeline stages;
a pointer register associated with each execution pipeline stage;
a value stored in at least one of the pointer registers, the value indicating a particular one of the entries in the pipefile
circuit means coupling the pipefile to selected ones of the operand inputs.

9. The data processor of claim 8 further comprising:
a selector coupled to each execution pipeline stage that produces a result, the selector coupled to selectively route the result to one of the pipefile entries identified by the value stored in the pointer register associated with that execution pipeline stage.

10. The data processor of claim 8 further comprising:
a pipefile bus communicating data stored in the pipefile, the pipefile bus comprising a plurality of lines where each line is associated with a particular pipeline execution stage;
a selector controlled by the values stored in the pointer registers, the selector coupled to each entry of the pipefile and the selector coupled to selectively route the data stored in each entry of the pipefile to a particular line of the pipefile bus.

11. The data processor of claim 8 further comprising a decoder pipeline stage operative to receive a new instruction before the new instruction is passed to the execution pipeline stages, the decoder including logic for assigning the value to be stored in the pointer registers.

12. The data processor of claim 11 wherein the execution pipeline stages include a write back pipeline stage, wherein the logic for assigning operates to assign values in a round-robin fashion such that the new instruction is assigned a value currently in the pointer register associated with the write back stage.

13. A method for forwarding data within a pipeline of a pipelined data processor comprising the steps of:
providing a plurality of execution pipeline stages where each stage includes logic for producing a storable instruction result;
providing a pipefile comprising a plurality of entries where each entry is associated with an execution pipeline stage;
when a result is generated by an execution pipeline stage, capturing the result for storage and storing the result in the associated entry in the pipefile;
coupling selected ones of the plurality of entries of the pipefile to predetermined ones of the plurality of execution units as operands; and
forwarding the captured result from the pipefile upon demand from an execution pipeline stage.

14. The method of claim 13 further comprising:
passing the instruction through the execution pipeline stages;
shifting the captured results in the pipefile so that the captured result remains in a pipefile entry associated with an execution stage in which its producing instruction resides.

* * * * *